United States Patent [19]

Albertson

[11] 4,302,029
[45] Nov. 24, 1981

[54] GOLF BAG CART

[76] Inventor: James T. Albertson, 205 S. Wilson, Wenatchee, Wash. 98801

[21] Appl. No.: 110,939

[22] Filed: Jan. 10, 1980

[51] Int. Cl.³ ............................................. B62B 1/20
[52] U.S. Cl. .................................. 280/646; 248/435; 280/47.26; 280/DIG. 6
[58] Field of Search .............. 280/645, 646, 652, 655, 280/47.37 R, DIG. 6, 639, 47.26; 248/434, 435, 168, 169

[56] References Cited

U.S. PATENT DOCUMENTS

| | | | |
|---|---|---|---|
| 2,399,518 | 4/1946 | Strain | 280/646 |
| 2,414,017 | 1/1947 | Carr et al. | 280/47.26 X |
| 2,547,829 | 4/1951 | Mills | 280/47.19 X |
| 2,681,810 | 6/1954 | Lowinski | . |
| 2,881,925 | 4/1959 | Idoux | . |
| 2,936,182 | 5/1960 | Williamson | 280/646 |
| 2,955,834 | 10/1960 | Jaskey | . |
| 3,150,881 | 9/1964 | Van Skyock | . |
| 3,165,330 | 1/1965 | Cotton | 280/645 |
| 3,360,279 | 12/1967 | Hunt | 280/35 |
| 3,900,209 | 8/1975 | McDonnell | 280/639 |
| 3,985,373 | 10/1976 | Widegren | 280/652 |
| 4,128,252 | 12/1978 | Raniero | 280/655 X |

FOREIGN PATENT DOCUMENTS

| | | | |
|---|---|---|---|
| 516437 | 9/1955 | Canada | 280/DIG. 6 |
| 633029 | 12/1949 | United Kingdom | 280/DIG. 6 |
| 1070197 | 6/1967 | United Kingdom | . |

Primary Examiner—Joseph F. Peters, Jr.
Assistant Examiner—Michael Mar
Attorney, Agent, or Firm—Wells, St. John & Roberts

[57] ABSTRACT

A golf bag cart providing wheeled support for a golf bag and that is collapsible to a relatively flat storage condition. The cart includes an elongated frame member having a pair of wheel supporting legs pivoted thereto. A bracket member joins the legs to the frame member to enable folding of the legs from spread, operative positions wherein the legs project outward of the frame, and compact storage positions wherein the legs are folded close to the frame with the wheels thereon situated adjacent a handle end of the frame. A removable tensioner releasably secures the legs in the operative and inoperative storage positions.

9 Claims, 6 Drawing Figures

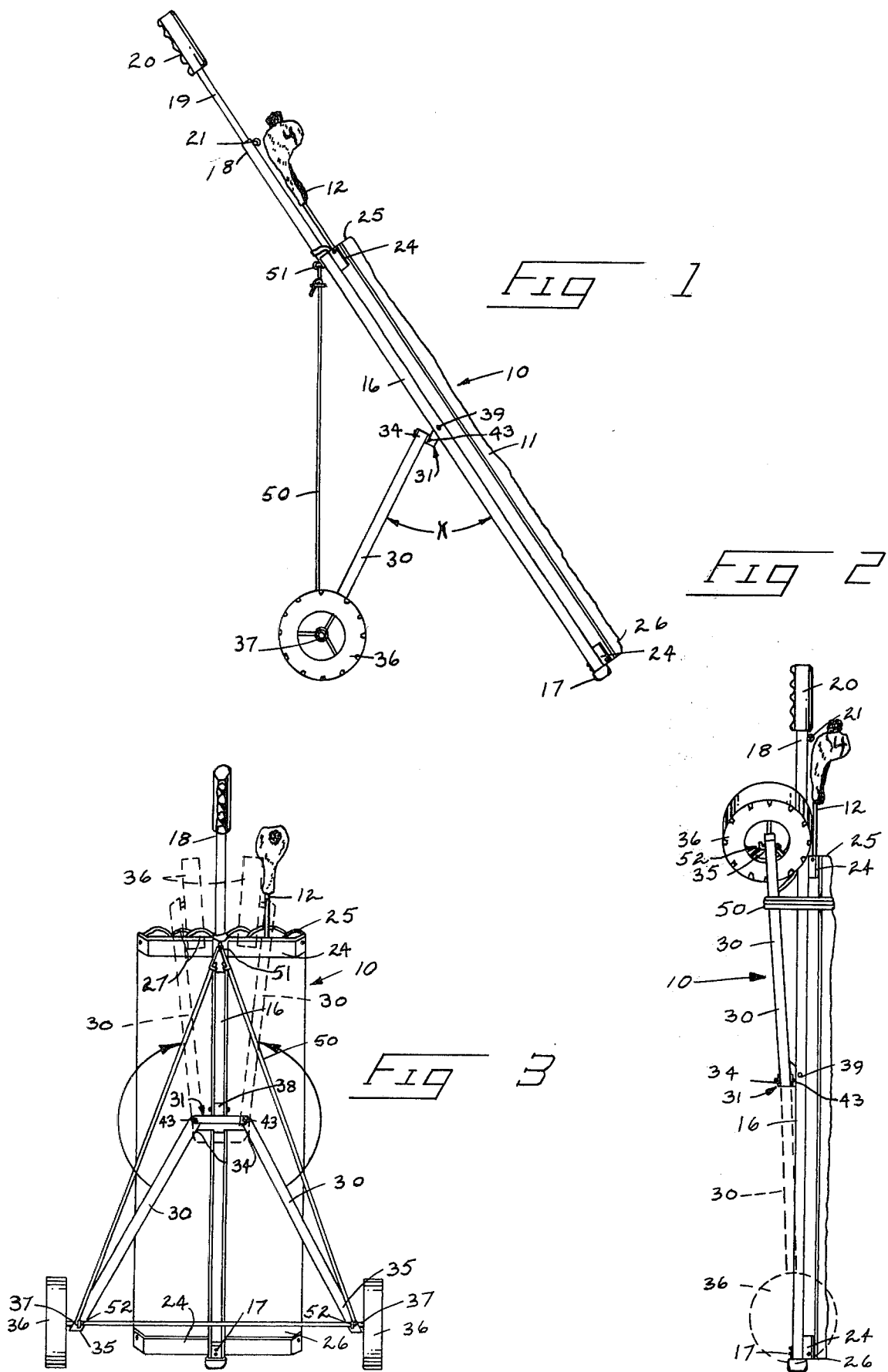

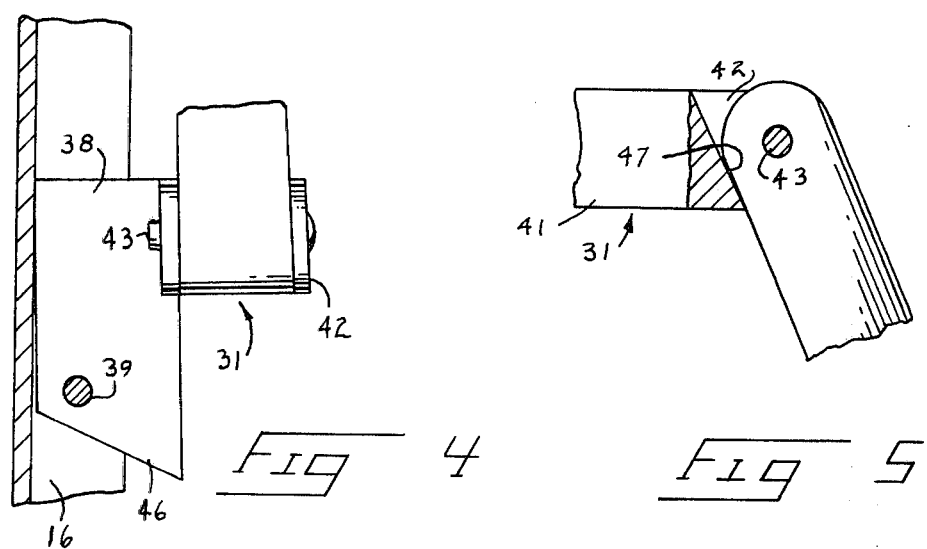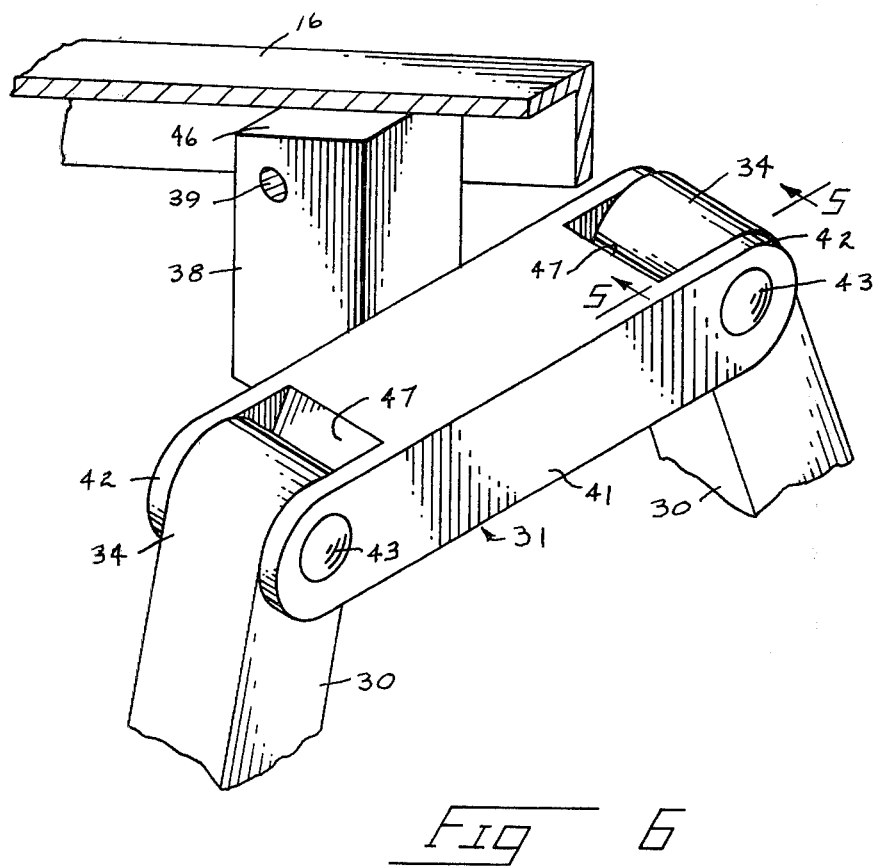

GOLF BAG CART

BACKGROUND OF THE INVENTION

The present invention relates to golf bag carts that are collapsible from open, operative positions to closed, inoperative storage conditions.

Numerous golf carts have been developed that provide wheeled support for carrying golf bags and clubs about a golf course. Such carts are usually pushed or pulled along by the golfer or his caddy. Many conventional carts function very well for their ultimate purpose in providing wheeled support to a usually heavy golf bag. However, the typical collapsible cart adds substantially to the space required for storage of the cart and bag. This becomes a significant problem with the increasing popularity of compact automobiles having relatively little storage space.

It becomes desirable then to obtain some form of golf bag cart that is collapsible to a compact configuration that will fit easily into a confined area. It is also desirable to obtain such a cart that is lightweight so it will not add significantly to the weight of the golf bag and clubs.

The above problems were recognized to a limited degree by B. J. Carr et al in U.S. Pat. No. 2,414,017. Carr discloses a collapsible golf bag carrier that includes a pivoted pair of legs and associated brace members mounted to a single central support frame. The wheels pivot intermediate opposed ends of the frame between operative and inoperative positions. In the inoperative position, however, the wheels of the cart are situated directly adjacent to the midsection of the golf bag and substantially increase the overall space requirement for the bag and carrier. Furthermore, the brace mechanisms and associated slider add to the weight of the carrier.

U.S. Pat. No. 3,360,279 to A. J. Hunt discloses a golf club carrier that recognizes, to a limited degree, the storage problem associated with other typical forms of golf bag carriers. The Hunt carrier includes a substantially "U shaped frame" with a rack on one side for mounting clubs in spaced relationship. The carrier therefore presents a somewhat flat configuration that decreases its overall storage space requirement from that required by other apparatus similar to the Carr collapsible carrier. The wheels of the Hunt carrier, however, swing about a horizontal axis back toward the bottom end of the carrier and so project forwardly of the carrier even in the closed, storage condition. The wheels of the Hunt carrier are not rigidly mounted to the carrying frame. Instead, they are yieldably positioned by tension members so they may pivot in response to contact with bumps or holes along the ground surface and absorb the impact rather than transmitting it directly to the frame.

The present golf bag cart represents a substantial improvement over the prior carts in that it functions as a lightweight, effective golf club carrying cart that will collapse to a storage condition that requires only minimal storage space.

BRIEF DESCRIPTION OF THE DRAWINGS

FIG. 1 is a side elevational view of the present cart showing it in an open, operative condition;

FIG. 2 is a similar elevational view only showing the cart in an inoperative storage condition;

FIG. 3 is a frontal view of the cart as seen from the left in FIG. 1;

FIG. 4 is an enlarged fragmentary sectional view showing a bracket mechanism for mounting the cart legs to the frame member;

FIG. 5 is a fragmentary sectional view taken substantially along line 5—5 in FIG. 6; and FIG. 6 is a fragmented pictorial view illustrating the bracket member for mounting the legs to the cart frame.

DETAILED DESCRIPTION OF A PREFERRED EMBODIMENT

The present golf bag cart is generally designated in the accompanying drawings by the reference numeral 10. The present cart 10 is intended to provide wheeled support for a golf bag 11 and one or more golf clubs 12. The cart is collapsible from the operative positions shown in FIG. 1 to an inoperative storage position shown by FIG. 2. The cart 10 when folded to the inoperative storage position will fit easily into a confined storage space such as the trunk of a compact automobile.

The present cart 10 includes a central elongated frame member 16. The frame member 16 extends from a foot end 17 to a handle end 18. The frame 16, between ends 17 and 18, is preferably "U-shaped" in cross section and formed of a lightweight metal, such as aluminum.

A telescoping handle 19 may be provided at the handle end of the frame. The telescoping handle 19 preferably includes a hand grip 20 at an outward end and is slidably mounted to the frame for adjustable positioning between an extended position as shown in FIG. 1 and a retracted position as shown in FIG. 2. A pin 21 is provided as means for locking the handle at the extended or retracted positions. The pin 21 is selectively positioned through appropriate apertures provided in the frame and telescoping handle 19.

One side of the frame member 16 includes a pair of bag mounting brackets 24 as means for securely mounting the bag 11 to the frame. The brackets are spaced longitudinally on the frame, with one situated adjacent the foot end 17 and the other adjacent the handle end 18. The brackets may be provided with an appropriate form of fastening device for securing the bag to the frame.

The bag 11 may be provided as an integral part of the present cart 10 or the brackets 24 can be adapted to mount other forms of golf bags to the frame member 16. Preferably, the bag 11 is substantially flat and elongated, having an open top end 25 situated adjacent the upper bracket and a closed bottom end 26 fastened to the bracket at the foot end of the frame. The bag 24 preferably has several transversely spaced pockets 27 extending longitudinally with respect to the frame member 16 to receive the shafts of several clubs. The number of spaced pockets 27 may vary.

The present cart 10 is also supplied with a pair of legs 30 that are pivotably mounted to the frame by a bracket means 31 (FIGS. 4-6). Each leg 30 includes an inner end 34 and an outward end 35. The legs are mounted at their inward ends to the frame member 16 at a longitudinal position thereon between the foot end 17 and handle end 18. Each leg 30 also mounts a wheel 36 for free rotation about a wheel axis. The wheel axes are defined by axles 37 that extend substantially transversely from the outer legs ends 35.

The bracket means 31 is mounted to the frame member 16 between legs of the "U shaped" cross section for pivotal movement about a fixed axis thereon. The fixed axis is situated substantially midway between the foot end 17 and handle end 18 of the frame member 16.

The bracket means 31 also provides pivoted support for legs 30 about leg pivot axes that are spaced transversely across the frame and that are perpendicular to the fixed pivot axis.

The bracket means 31 functions basically to enable pivotal movement of the legs relative to the frame between the operative position (FIGS. 1 and 3) and the inoperative storage position (FIG. 2). In the operative position, the legs 30 diverge from one another and project outward of the frame member 16 to form an acute angle (designated at X in FIG. 1) with that part of the frame extending between the fixed pivot axis and the foot end 17. In the inoperative position, the legs 30 are pivoted to positions adjacent to one another (dashed lines FIG. 3) and to the frame member 16 so the wheels are located close together and adjacent the handle end of the frame member.

The bracket means 31 is preferably formed of a unitary casting in a "T" configuration. A projecting upright leg 38 of the "T" shape is received between the corresponding legs of the inverted "U" shape of the frame member. A pin 39 extends through the frame member and leg 38 to define the fixed transverse pivot axis. A cross member of the "T shape" is designated at 41. The cross member 41 extends transversely to slotted ends 42. The inward ends of the legs 30 are received by the slotted ends 42 and are mounted thereto by pins 43. These pins define the parallel leg pivot axes.

A stop means is provided integral with the bracket means 31 to prevent pivotal movement of the bracket and legs about the fixed axis toward the handle end of the frame beyond the acute angle "X". The stop means also is provided to prevent inward pivotal movement of legs 30 when they are situated in the operative positions.

The stop means preferably includes an abutment surface 46 formed across an end of the leg 38. The surface 46 will come into abutment with the frame member 16 when the bracket is pivoted outwardly of the frame to the operative position. FIG. 6 shows the abutment surface 46 engaging the frame member 16. FIG. 4 shows the surface 46 when the bracket and legs are pivoted to the inoperative storage position.

The stop means also includes abutment surfaces 47 that are formed within the slotted ends of the cross member 41. The abutment surfaces 47 engage the legs 30 when they are pivoted to the diverging operative positions shown in FIGS. 3, 5 and 6. The inward ends of the legs 30 are formed on a radius so the legs are allowed to pivot relative to the abutment surfaces 47 from the operative, diverging positions to the inoperative positions shown by FIG. 2 and in dashed lines in FIG. 3.

Tensions means, in the form of an elongated resilient strap 50, yieldably secures the legs and wheels in the operative positions and holds the legs close to the frame member 16 when they have been pivoted to their respective inoperative storage positions. The strap 50 is preferably formed of rubber or other resilient extensible material. It includes hooked ends that are releasably received by an eyelet connector 51 on the frame member 16. The connector 51 is situated adjacent the handle end of the frame. Open hooks 52 are situated at the outer ends 35 of legs 30. The strap 51 can be connected at its free end to the connector 51 and stretched through hooks 52 to form a triangular configuration as shown in FIG. 3.

The strap 50 urges the legs inwardly against the abutment surfaces 47 and yieldably pulls the legs and bracket forwardly, holding the abutment surface 46 against the frame. The wheels 10, however, deflect rearwardly together or individually as the wheels encounter obstacles along the ground surface. The strap 50 will absorb the energy of the impact and avoid transmitting it to the frame member 16.

The strap 50 is also useful in holding the leg members in their inoperative storage positions as shown in FIG. 2. There, the strap 50 has been removed from the connectors 52 and wrapped about the legs 30 and bag 11.

The legs of the cart can be shifted from the inoperative storage positions to the operative position simply by unhooking one end of the strap 50 from the connector 51 and unwrapping the strap from around the legs and bag. The legs will then fall downwardly, pivoting about the leg axes at pins 43 to the position illustrated by dashed lines in FIG. 2. The legs will pivot downwardly against the abutment surfaces 47 automatically assuming the operative, diverging positions. The legs and brackets are then pivoted forwardly about the fixed pivot axis of pin 39 to bring the abutment surface 46 against the frame member 16. The abutment surface 46 automatically stops the legs at the acute angle "X" relative to the frame.

Finally, the strap 50 is connected at its hooked ends to the connector 51 and stretched over the connectors 52 on the legs 30. This places the strap under tension so it will yieldably hold the legs and bracket in their operative positions. The telescoping handle 19 can be extended simply by removing the pin 21 and sliding the telescoping handle 19 longitudinally outward of the frame member 16. The pin can then be reinserted to lock the telescoping handle 19 and grip 20 in the extended position. The cart is then ready for use.

In operation, it is preferable that the cart be pulled rather than pushed along the ground surface. When objects are encountered by either one or both of the wheels 36, the legs will then deflect rearwardly under tension of the strap 50. Strap 50 will automatically pull the legs back into the operative position after the obstruction is passed over.

The above description and attached drawings are given by way of example to set forth a preferred embodiment of the present invention, the scope of which is more precisely set forth in the following claims.

What I claim is:

1. A collapsible golf bag cart, comprising:
   an elongated frame member extending from a foot end to a handle end;
   means for mounting a golf bag to the frame member;
   a pair of elongated legs, each having an inward end and an outward end;
   a pair of wheels mounted to the outward leg ends for free rotation about wheel axes;
   means on the frame member for pivotally mounting the inner ends of the legs for movement between operative positions wherein the legs diverge from one another and project outwardly from the frame member to form an acute angle with part of the frame member and inoperative positions wherein the legs are adjacent to both one another and to the frame and the wheels are adjacent to one another and to the handle end of the frame member;

an elongated extensible strap means releasably connectable to the frame member and legs for yieldably urging the legs outwardly from the frame member toward the operative positions and for alternatively holding the legs together against the frame member when in the inoperative positions; and stop means operably interposed between the legs and frame member for preventing pivotal movement of the legs outwardly from the frame member beyond their respective operative positions.

2. The cart as defined in claim 1 wherein:

said frame member includes a connector adjacent its handle end for mounting the strap means to the frame member;

each of the legs includes similar connectors adjacent the outward ends thereof for releasably mounting the strap means.

3. The cart as defined by claim 1 wherein the frame member comprises:

an elongated channel of "U" shaped cross section;

said bracket means being formed of a "T" shaped casting;

the leg of the "T" shape pivotably received between the legs of the "U" shaped channel.

4. The cart as defined by claim 1 wherein the bag mounting means comprises:

a pair of transverse brackets, one of which is positioned on the frame member on a side thereof opposite the bracket means and adjacent the handle end, the other being positioned on the same side of the frame adjacent the foot end thereof.

5. The cart as defined by claim 1 wherein the frame member includes:

a telescoping handle longitudinally slidable thereon to extend the effective length of the frame member; and pin means for selectively securing the handle at extended and retracted positions relative to the foot end of the frame member.

6. The cart as defined by claim 1 further comprising:

a flat golf bag attached to the frame member by the bag mounting means, the bag including a plurality of transversely spaced pockets, each adapted to receive a golf club.

7. The cart as claimed by claim 1 wherein said means for pivotally mounting the inner ends of the legs is comprised of:

bracket means on the frame for pivotal movement about a fixed axis transverse to the frame and situated between the foot and the handle ends, said bracket means mounting each leg at its inner end to the frame member for free pivotal movement about a pivot axis transverse to the fixed axis, the legs each being pivotal about the fixed axis and the pivot axis between their operative position and their inoperative position; and wherein the stop means includes:

a first stop between the bracket and frame member; and a second stop between each of said legs and said bracket.

8. The cart as defined in claim 7 wherein the wheel axes are coaxial and parallel to the fixed axis when the legs are at their respective operative positions.

9. The cart as defined by claim 7 wherein the bracket means comprises:

a "T" shaped block having a protruding center leg;

the leg of the "T" shaped block being pivotably mounted to the frame member about the fixed axis and the cross part of the "T" shaped block extending transversely of the frame members to ends that mount the inner ends of the legs about pivot axes that are parallel to one another and perpendicular to the fixed axis.

* * * * *